April 2, 1963  W. A. WILSON ETAL  3,084,259
METHOD OF DETERMINING PIPELINE LEAKAGE
Filed Aug. 24, 1959

INVENTORS:
William A. Wilson
George S. John

United States Patent Office 3,084,259
Patented Apr. 2, 1963

3,084,259
METHOD OF DETERMINING PIPELINE LEAKAGE
William A. Wilson, Griffith, and George S. John, South Bend, Ind., assignors to Standard Oil Company, Chicago, Ill., a corporation of Indiana
Filed Aug. 24, 1959, Ser. No. 835,757
4 Claims. (Cl. 250—106)

This invention relates to a method of determining leaks in a conduit, and in particular to a method of locating leaks and measuring the rate of leakage in a pipeline by the use of radioactive materials.

It has been the practice to locate leaks in oil and gas pipelines, lead-sheathed cables and other buried conduits by injecting a fluid tagged with a radioisotope into the pipe or cable, pumping the same through the conduit, and then spotting leaks by a radioactivity survey along the line to locate the point(s) where the radioactive isotope-bearing material has leaked from the conduit into the ground. A disadvantage of this method is that where structures are buried deep in the ground the earth will exert a shielding effect which renders it difficult if not impossible to locate a leak. If a high enough concentration of activity is used to overcome the shielding effect of the ground, then it is difficult to handle the radioactive material. It is not practical to bore a large number of test holes in the ground when long sections of pipe are to be tested, as in the case of a pipeline.

Another method of testing for leaks with radioactive tracers has been to follow the movement of a radioisotope injected into a line while the line is under test pressure. The tracer will flow with the test fluid toward the leak, and this movement can be used to aid in determining the location of the leak. However, if a closed valve downstream of the "slug" of tracer material is leaking, the tracer will change position, and it is not possible to tell whether the leak is in the valve, the wall of the pipeline or both.

The present invention overcomes these disadvantages of the former methods by providing a method whereby the location and rate of leakage in a conduit are more easily determined by the use of multiple injections of a radioactive tracer material into a section of the conduit to be tested. By this method leakage through valves may be readily differentiated from leakage through the wall of the conduit, and the location of leaks in the conduit wall are more readily determined by observing the changes in the relative positions of multiple injections of a radioactive tracer material initially spaced at known intervals in the conduit before applying the desired test pressure.

Figure 1:
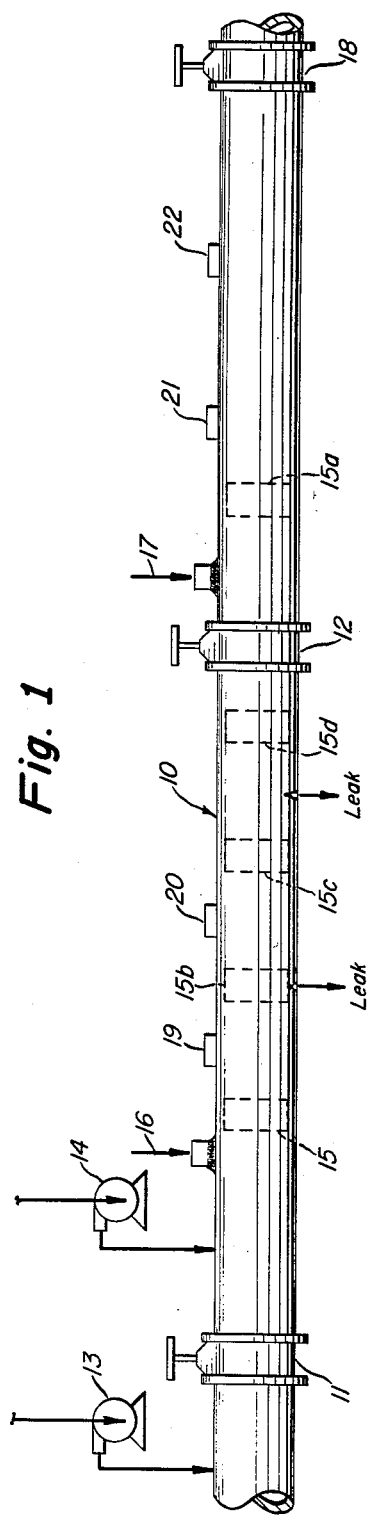
Figure 2:
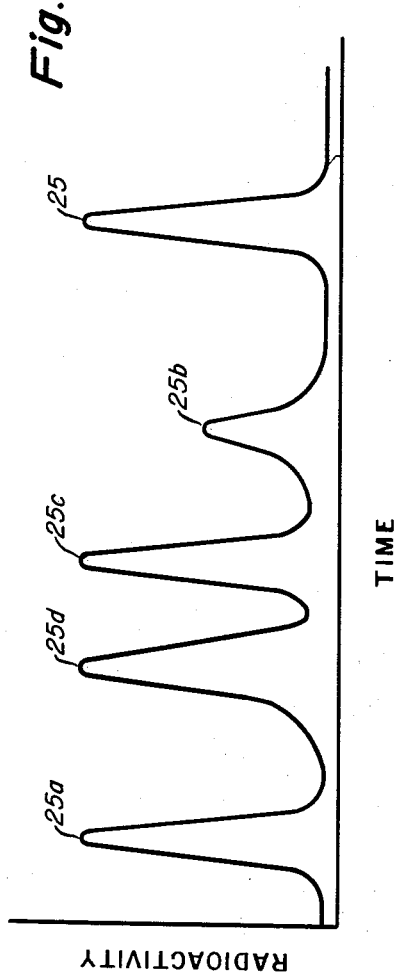

Other objects and a fuller understanding of the invention may be had by referring to the following description and accommpanying drawings in which:

FIGURE 1 is a diagrammatic representation of a pipeline showing the accessorial equipment, and FIGURE 2 shows a plot of radioactivity vs. time for a number of discrete quantities of radioactive material flowing through a pipeline.

Although the method of determining leaks will be described in connection with the pipeline, it is to be understood that the invention may be applied to other fluid carrying conduits including process lines, water mains and the like. The radioactive tracer material selected may be either soluble or insoluble in the test fluid, which may be a liquid or a gas, so that it is compatible with the test fluid and the nature of the test.

The invention may be utilized in the following manner. In FIGURE 1, a section of the pipeline 10 between a first valve 11 and a second valve 12 is suspected of leaking. The flow in the pipe is stopped and valves 11 and 12 are closed, so as to block off that section of conduit between the valves 11 and 12. Pumps 13 and 14 are started and the sections on both sides of valve 11 are pressured to the desired test pressure. The pressure is equalized on both sides of the first valve 11 to insure that there is no flow through the valve 11. At points 16 and 17 several millicuries of a radioisotope 15 and 15a, are injected into the line. The section of pipeline 10 is then kept at constant test pressure by pump 14. If there is a leak, either out of the pipe 10 or through the closed valve 12, continuous pumping to maintain pressure will be necessary. If there is a leak out of the pipe between point 16 and valve 12 the radioactive "slug" injected at point 16 will move toward valve 12. If there is also a leak through valve 18 (or out of the section between point 17 and valve 18), the slug injected at point 17 will move toward valve 18. The movement of the radioactive tracer may be monitored by a gamma ray detector 21, such as a scintillation counter, placed at a suitable location downstream from the injection point. The detector may be connected with a scaler, rate meter recorder or other suitable instrumentation known to the art. The velocities of these slugs can be determined by measuring the time necessary for the peaks in radioactivity to pass two predetermined points 19 and 20 downstream from point 16 and two points 21 and 22 downstream from point 17. When these velocities are determined, the test is over and the line may either be put back in service, or further exploratory work done to pinpoint the leak.

The leak rate out of the section between the valves 11 and 12 will be proportional to the difference in velocities of the radioactive material injected at points 16 and 17. If the velocities of these radioactive slugs are equal, there is no leak.

A similar manner of testing may be carried out by utilizing the radioactive tracer prepared as above, and injecting a number of discrete quantities of the tracer materials 15, 23, 24 and 25 into the pipeline 11 flowing at a steady rate at an injection point 16. These injections are carefully made at spaced intervals so that the longitudinal spacing of the slugs of tracer material is known. The spacing used for a particular test will be determined by the nature of the test, but should provide a volume of fluid between the injections greater than the quantity of tracer lost through leakage during the course of the test, so that the slugs of tracer material remain separate and distinct. It is to be understood that the spacing of the injections may vary widely, and need not be equally spaced, as long as the spacing is known. The section of conduit under test may vary from a few feet to several miles in length. For instance, in testing a section of pipeline three miles in length, the injections may be made at approximately 1500 feet spacing. Correspondingly, the pumping equipment and amount of radioactive tracer injected may vary according to the length and diameter of the conduit tested. When the first slug 25 injected is near valve 12 the line is shut down, valves 11 and 12 closed and the section pumped to the desired pressure with pump 14. The line is then held under test pressure for a predetermined period of time, of about 24 hours. If there is a leak in the line between any two of the slugs, spacing between the slugs will diminish by an amount equal to the volume which leaks out of the line. If there is a leak at a point where there is a radioisotope, the activity of that slug will be decreased by an amount corresponding to the amount of radioactive material lost by leakage. If there is a leak downstream of all of the injections, the injections will move the same distance in a given interval of time.

After the expiration of the test period valves 11 and 12 are opened again, and flow through the line is resumed. A suitable radioactivity detection means such as a crystal scintillation detector is placed at point 21, downstream from valve 12, and as the slugs of radioactive tracer move past, a wave of radioactivity is recorded by a rate meter recorder connected to the detector. A plot of Time vs. Radioactivity is made as shown in FIGURE 2. Each peak in the radioactivity plot represents an injection of the radioisotope tracer, and the time required for the corresponding injection to move past the detector 21 downstream of the injections. Thus, the peaks 25a, 25d, 25c, 25b and 25 correspond to the injections 15a, 15d, 15c, 15b and 15 respectively, and are indicative of the relative spacings of the corresponding injections of radioactive tracer, as well as the intensities after the expiration of the test period. The height of a wave for a particular slug will be lowered when a part of the isotope is lost through leakage in the conduit. If leakage occurs between two slugs of tracer material, they will tend to move closer together by a distance proportional to the fluid lost. The rate of leakage can be determined from a knowledge of the volume of fluid lost and the time elapsed.

In accordance with the present invention it is preferable to use a short-lived radioisotope emitting penetrating radiations, but the nature of the particular problem will govern the specific isotope used and the procedure to be followed. Sodium-24 is generally very suitable for pipeline testing because its half-life of approximately 15 hours presents no disposal problem. It emits strong gamma rays of 1.4 and 2.8 mev. which is sufficient to penetrate heavy wall line pipe. However, other isotopes may be used which have half lives commensurate with the nature of the problem and which have high enough energy radiation to be readily detected. Material which emits primarily alpha and beta radiation may be used if a pervious window is provided in the line which readily passes these particles. However, gamma radiation is more suitable since it readily penetrates the pipe wall, and no special equipment is required in order that it may be detected. The isotope should be soluble in the material carried by the pipeline or at least in a fine colloidal suspension which has little tendency to settle out or stratify in the fluid.

In practice a sodium-24 alcoholate is preferred where the material carried by the pipeline is gasoline or similar product. The sodium-24 may be obtained by neutron irradiation of sodium metal. For example, a 1-gram sample of sodium metal was sealed in a quartz vial and then irradiated for six hours at a neutron flux of $1.2 \times 10^{12}$ neutrons per square centimeter per second. Approximately 100 millicuries of sodium-24 were obtained under these conditions. The sodium-24 tracer may be prepared by dissolving approximately 1 gram of the neutron irradiated metallic sodium in a mixture of isopropyl and methyl alcohols. The sodium is initially placed in isopropyl alcohol and then enough methyl alcohol is added to obtain the desired rate of dissolution. The resulting mixture of alkoxides in alcohol is completely soluble in such liquids as hexane, isooctane and gasoline, and these liquids can be used as diluents if desired. Radioactive tracers utilizing other isotopes of the alkali metals such as potassium, and cesium may be prepared in a similar manner, and the diluent so chosen as to be compatible with the products carried by the pipeline.

The radioactive tracer is injected into the pipeline at a suitable rate, preferably fast enough to obtain a dense slug of radioactive material in the product. In a typical pipeline leak test the radioisotope tracer was pumped into the pipeline at the rate of 16 milliliters per minute while the pipeline flow was 1400 barrels per hour. In another instance the injection of the tracer into the fluid blocked off in the section of conduit to be tested was accomplished by using a pressurized gas. Of course, the injection rate may be varied to fit the nature of the particular test. Upon survey with the portable scintillation counter it may be observed that there has been a dilution and spreading out of the slug of radioactive material and the extent of this will be governed by the velocity, degree of turbulence, viscosity of the pumped material and other factors. However, peaks will remain in the radioactivity plot which can be used to determine relative spacings of injections.

Although the invention has been described in its preferred form, it is understood that this description of the preferred form is by way of example only, and numerous changes in the details of operation and arrangement of parts may be resorted to without departing from the spirit and scope of the invention hereinafter claimed.

Having fully described our invention, what we claim is:

1. The method of testing for leaks in a section of conduit which comprises the steps of establishing at least two spaced apart injections of a radioactive tracer material in a fluid contained in said section of conduit; maintaining said fluid in said section of conduit at a pre-selected pressure under static flow conditions; resuming flow of said fluid through said conduit; and determining the location and rate of leakage from said section of conduit by monitoring the spacing of the injections of radioactive tracer material in the fluid flowing through said conduit.

2. The method of testing for leaks in a section of conduit which comprises the steps of establishing at least two spaced apart injections of a radioactive tracer material in a fluid contained in said section of conduit; maintaining said fluid in said section of conduit at a pre-selected pressure under static flow conditions; resuming flow of said fluid through said conduit; and determining the location and rate of leakage from said section of conduit by monitoring the spacing and radiation intensities of the injections of radioactive tracer material in the fluid flow through said conduit.

3. The method of determining leakage in a conduit which comprises the steps of introducing a plurality of injections of radioactive material at spaced apart intervals into the conduit through which a fluid is flowing at a steady rate; blocking off a section of the conduit upstream and downstream of said injections of radioactive material; maintaining the pressure of said fluid in the blocked off section of the conduit for a predetermined period of time; resuming the flow of fluid again; and determining the location and rate of leakage from said conduit by monitoring the spacing and radiation intensities of the injections of radioactive tracer materials in the fluid flowing through said conduit.

4. The method of determining leaks in a section of a fluid-carrying conduit located between a first and a second valve, which comprises the steps of stopping the flow of fluid through the conduit; closing said first and second valves; pressuring conduit on both sides of said first valve to the desired test pressure; injecting radioactive tracers at least one point downstream of said first valve and at at least one point downstream of said second valve; maintaining said test pressure; and measuring the direction and velocity of movement of said radioactive tracers by means of radiation detection apparatus so located as to indicate changes in location of said radioactive tracers within the conduit.

References Cited in the file of this patent

UNITED STATES PATENTS 2,617,941 Craggs _____ Nov. 11, 1952
2,640,936 Pajes _____ June 2, 1953

OTHER REFERENCES

Application of Radioisotopes to Leakage and Hydraulic Problems, by Putnam et al., International Conference on Peaceful Uses of Atomic Energy, The United Nations Press, 1955, vol. 15, pages 147 to 150.

Radioistopes in Petroleum Refining, by Hull et al., International Conference on Peaceful Uses of Atomic Energy, The United Nations Press, 1955, vol. 15, pages 199 to 210.